Dec. 2, 1958   F. FORCIA ET AL   2,862,754
PASTRY SERVER
Filed Aug. 23, 1955

INVENTOR
FRANCES FORCIA
MAXINE A. BUNNING

BY
ATTORNEYS

United States Patent Office 2,862,754
Patented Dec. 2, 1958

2,862,754

PASTRY SERVER

Frances Forcia and Maxine A. Bunning, Eugene, Oreg.

Application August 23, 1955, Serial No. 530,116

4 Claims. (Cl. 294—1)

The present invention relates to culinary implements and, more particularly, to an improved pastry lifter and setter for transferring pie crust and the like from a dough board to a pie plate or pan.

Heretofore, in the process of baking pies and the like, it has been difficult to transfer the thin layers of pie crust dough from the pastry board to the pie plate without tearing or otherwise damaging the crust.

Accordingly, an important object is to provide a simple, efficient, and economical pastry lifter including a pair of pivotally connected flat plates operable normally to assume a closed position, so as to be readily inserted below a thin layer of pie crust dough or the like on the pastry board, so as to transfer the same to a pie pan without tearing or breaking the thin crust and in such a manner as to insure the proper positioning of the thin pie crust centrally of the pan.

Other objects and advantages of the invention will become apparent from the following description when taken in conjunction with the accompanying claims and drawings.

Referring to the drawings in which is shown for illustrative purposes a preferred embodiment of the invention:

Figure 1:
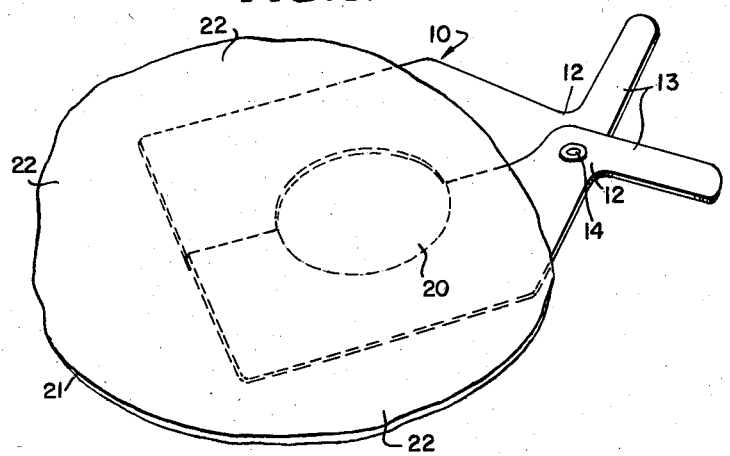
Figure 1 is a perspective view of the pastry lifter positioned in its closed position and beneath a thin layer of pie crust dough preparatory to transferring the same to a pie plate.
Figure 2:
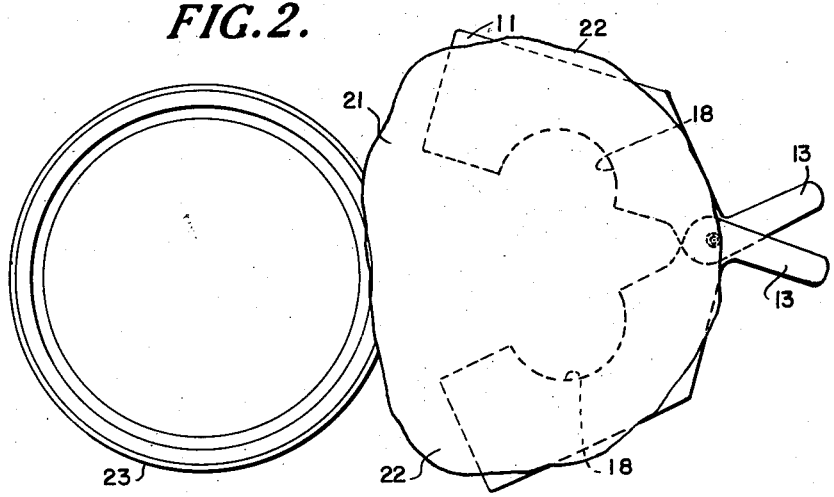
Figure 2 is a detailed plan view of the lifter shown in Figure 1 but in its opened position so as to increase its lifting area and supporting the pie crust dough so as to properly position it above a pie pan or plate.
Figure 3:
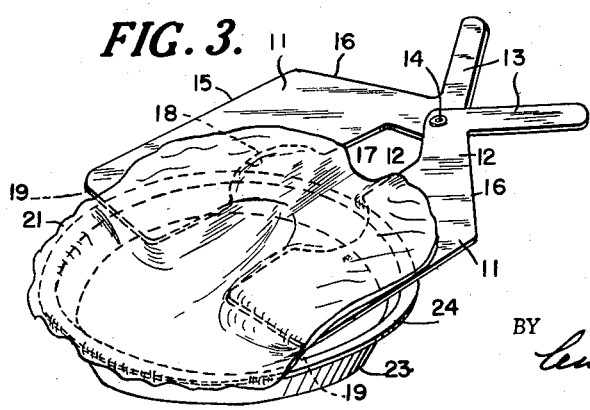
Figure 3 is a perspective view showing the lifter properly positioning the thin pie crust dough on the pan.

Referring to the drawings, 10 generally indicates the improved pastry lifter constructed in accordance with the present invention. As shown, the lifter includes a pair of similarly shaped thin flat elongated plate members or blades 11 made of any suitable light durable metal, such as aluminum. Each plate 11 at one end has an inwardly and laterally extending inclined arm or shoulder 12 that terminates in an angularly disposed reduced flat handle portion 13 (Fig. 3). The shoulder portions 12 overlap and are pivoted together by the pin or bolt 14. Each of the blades 11 has an outer straight side edge 15 connected to an inclined side edge 16 that merges into the side of the handle portion 13. Each of the blades 11 is also formed with an inner straight side edge 17 parallel to the edge 15 and which may be provided intermediate its ends with a recessed or curved portion 18. The outer or front end of the blades 11 have thin transverse straight edges 19 arranged in transverse alignment with each other when the blades are moved to their closed position, as shown in Figure 1. In this position, also the semi-circular recesses 18 formed in the inner sides of the confronting blades 11 coact to form a substantially circular opening 20.

In operation, assuming that the uncooked pastry or dough 21 (Fig. 1) has been rolled out on a pastry board to form a thin pie crust preparatory to being transferred to a baking pan or pie plate, the lifter 10 is initially inserted or slipped under the pie crust 21 and the blades are moved to their closed position with the inner edges 17 thereof in abutting engagement or close proximity to each other and the semi-circular portions 18 forming the circular opening 20 (Fig. 1). In this closed position of the lifter, it will be noted that the thin pie crust 21 has unsupported portions, such as 22 (Fig. 1), extending beyond the outer edges of the closed blades 11, and would have a tendency to bend downwardly and sag, if allowed to remain unsupported. Therefore, the blades 11 are pivotally connected so as to be swung outwardly by the manual operation of the angularly disposed handles 13 in order to spread the supporting area of the blades 11 laterally and outwardly and thus prevent the outer marginal portions 22 from sagging or breaking off of the body of the pie crust. The circular opening 20, when the blades are in their closed position (Fig. 1), allows the intermediate portion of the pie crust dough to drop or sag a little. As the blades 11 are moved away from each other, the opening 20 increases so that the pie crust has a depending substantially central portion which, when positioned above the pie plate or pan 23 (Fig. 3), insures the centering of the pie crust and its proper insertion into the pan. When the pie crust 21 is properly positioned over the pan 23, the handles 13 are manually actuated so as to cause the blades 11 to be moved to their closed positions and during this movement the pie crust 21 is guided by the lifter so as to lap over the top or flange portion 24 of the pan and the lifter is withdrawn both from the pan and the pie crust, thus insuring the proper positioning of the thin pie crust into the pan at a minimum expenditure of time and effort. Moreover, by reason of the means provided for varying the supporting area of the lifter the thin pie crust or other pastry may easily be transferred from a dough board to any suitable baking or cooking utensil without danger of the crust breaking or otherwise being damaged during such movement.

It will be seen that the pastry lifter is admirably suitable for handling and transferring thick or thin pastry crust dough from a rolling board to the baking pan without danger of tearing, creasing or otherwise damaging the uncooked dough. Further, the recesses 18 in the blades cause an intermediate portion of the pie crust to sag or drop slightly when positioned thereon, thus providing means for insuring the dough being initially shaped to fit into the pan or plate as the lifter 10 is withdrawn from dough.

It will be understood that the form of the invention shown is merely illustrative and that such changes may be made as come within the scope of the following claims.

We claim:

1. An implement for handling pie crust and the like including a pair of similarly formed flat members pivotally connected between their ends to provide a pair of thin coacting plates on one side of the pivot and a pair of operating handles on the opposite side of the pivot, said plates being operable for movement inwardly to a closed position or outwardly to an opened position, said plates when in their closed position having abutting edges, said edges being angularly spaced when the plates are in their opened position, the parts of the implement being constructed and arranged so that when the plates are in their closed position the ends thereof may be initially moved under the pie crust to support the same, and said plates being movable to their opened position by actuation of said handles towards each other to spread the supporting area thereof.

2. An implement for handling pie crust, as called for in claim 1, in which the plates have confronting recesses forming a closed opening when the plates are brought together so as to provide an unsupporting portion for allowing an intermediate portion of the pie crust to sag.

3. An implement for handling pie crust, as called for in claim 1, in which the plates have confronting inner straight meeting edges provided with opposed curved recesses forming a closed opening when the plates are brought together so as to form an unsupporting portion for allowing the intermediate portion of the pie crust to sag and also means for insuring the centering of the pie crust on the pan.

4. An implement for handling pie crust, as called for in claim 1, in which the plates are provided with confronting substantially semi-circular recesses forming a substantially circular opening when the plates are brought together so as to provide means for insuring the centering of the pie crust on the pan.

References Cited in the file of this patent

UNITED STATES PATENTS

| | | |
|---|---|---|
| 2,063,432 | Greene et al. | Dec. 8, 1936 |
| 2,156,014 | Greene et al. | Apr. 25, 1939 |